United States Patent [19]
Girguis

[11] Patent Number: 5,035,311
[45] Date of Patent: * Jul. 30, 1991

[54] OVERLOAD CLUTCH

[76] Inventor: Sobhy L. Girguis, Magdalenenstrasse 19, 5210 Troisdorf 14, Fed. Rep. of Germany

[*] Notice: The portion of the term of this patent subsequent to Jan. 30, 2007 has been disclaimed.

[21] Appl. No.: 424,056

[22] Filed: Oct. 19, 1989

Related U.S. Application Data

[62] Division of Ser. No. 93,465, Sep. 4, 1987, Pat. No. 4,896,755.

[30] Foreign Application Priority Data

Sep. 5, 1986 [DE] Fed. Rep. of Germany ... 8623878[U]

[51] Int. Cl.$^5$ ............ F16D 7/08; F16D 43/206
[52] U.S. Cl. ................ 192/56 R; 464/36; 464/38
[58] Field of Search ............. 192/56 R; 464/36, 38, 464/39

[56] References Cited

U.S. PATENT DOCUMENTS

| | | | |
|---|---|---|---|
| 2,969,132 | 1/1961 | Stewart | 192/56 R |
| 3,095,955 | 7/1963 | Orwin | 192/56 R |
| 3,185,275 | 5/1965 | Orwin | 192/56 R |
| 3,270,844 | 9/1966 | Orwin | 192/56 R X |
| 3,319,753 | 5/1967 | Orwin et al. | 192/56 R |
| 4,263,996 | 4/1981 | Putney | 192/56 R |
| 4,467,902 | 8/1984 | Girguis | 192/56 R |

Primary Examiner—Richard Lorence
Attorney, Agent, or Firm—Herbert Dubno

[57] ABSTRACT

An overload clutch has a pair of clutch members relatively rotatable about an axis and each formed with an axially forwardly directed track and with a plurality of angularly spaced seats opening into the track, these seats being alignable to form axially forwardly open pockets in at least one relative angular position of the members. A bearing supports the members on each other for relative rotation about the clutch axis. Respective rollers engageable in the pockets are angularly displaceable in the tracks so that when they are in the pockets the two members are rotationally coupled such that one can drive the other and when the rollers are in the track the members are relatively rotatable. A ring member operatively backwardly engaging the rollers is pressed by a spring backward relative to the clutch members against the rollers to urge the rollers into the pockets, the flank angle of the seats being such that rollers in the pockets are pressed forward against the ring member with a force component largely dependent on torque transmitted between the two clutch members. An abutment on one of the members is operatively engageable with the rollers to limit their angular travel in the tracks relative to the one member.

10 Claims, 10 Drawing Sheets

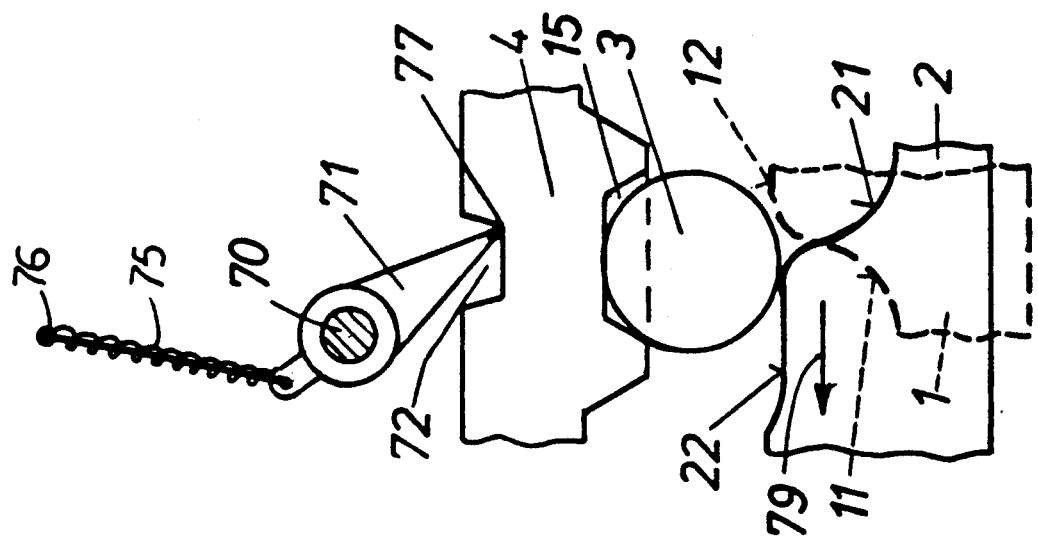
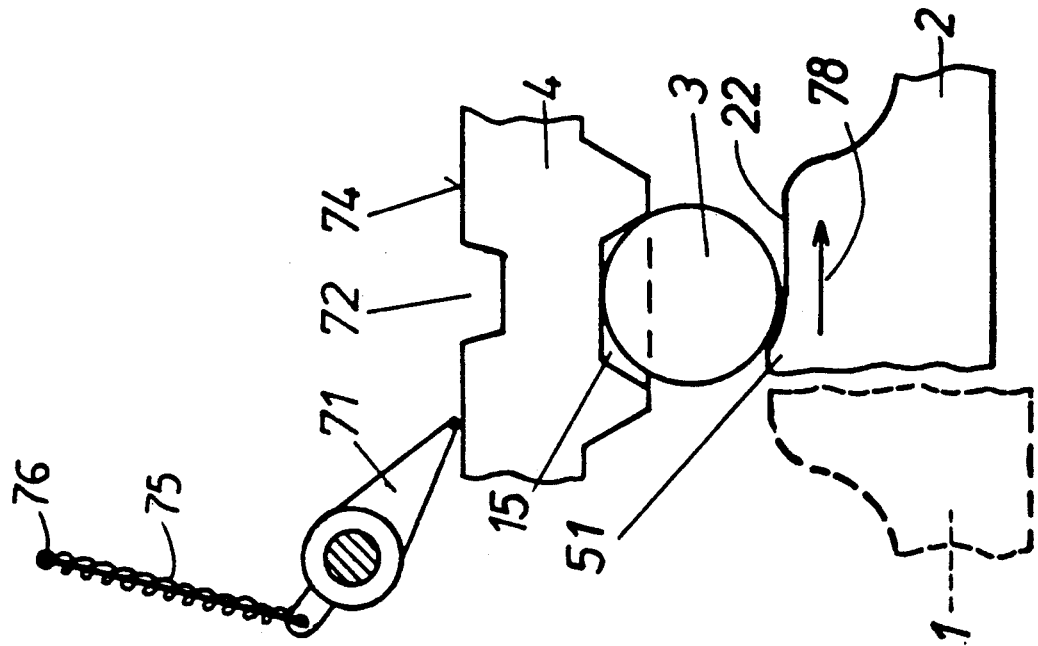
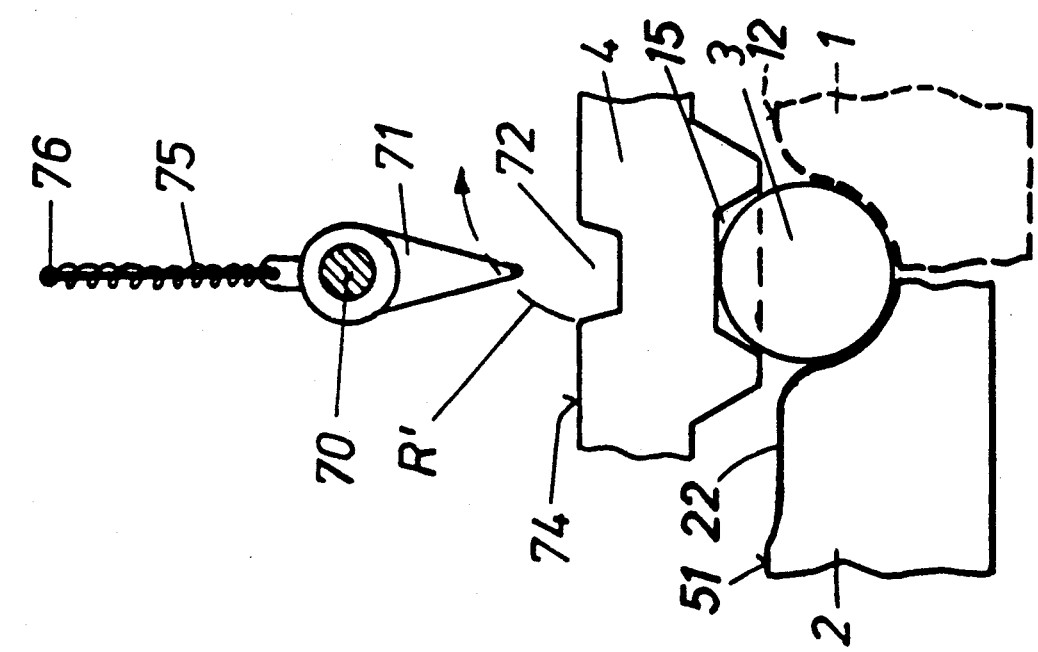

OVERLOAD CLUTCH

This is a divisional of co-pending application Ser. No. 07/093,465 filed on Sept. 4, 1987 now U.S. Pat. No. 4,896,755.

FIELD OF THE INVENTION

The present invention relates to an overload clutch. More particularly this invention concerns such a clutch which automatically opens when a predetermined torque is exceeded.

BACKGROUND OF THE INVENTION

A standard overload clutch such as described in my U.S. Pat. No. 4,467,902 based on German patent 3,009,244 filed 11 March 1980 has a driven and a driving clutch member both rotatable about a clutch axis. The members have adjacent endless tracks that together form an annular groove centered on the axis and each member is formed with a plurality of seats that open into the track groove. The seats of the members are identically angularly spaced so that each can be aligned with a respective seat of the other member to form therewith a pocket open into the groove. Rollers, typically balls or wheels usually carried on a cage can either roll around the tracks or sit in the seats. A spring braced against the cage or a pusher ring urges these rollers into the pockets in which position they rotationally link the two members.

At least one side of each pocket is inclined, that is nonradial of or nonparallel to the clutch axis, so that when torque is being transmitted from the driving member to the driven member a component of this force urges the balls out of the pockets against the spring force. When the torque transmitted through the clutch exceeds a predetermined limit this component exceeds the spring force and the balls move out of the pockets and into in the track where they are confined in lodgements, thereby decoupling the two members. Such a clutch is useful, for example, in a piece of agricultural equipment where a feed must stop when jammed with crop so that the machine operator can clear the jam. To reseat the rollers in the pockets it is necessary to reverse rotate one of the members, thereby moving the recesses back into alignment and allowing the spring to push the rollers back into the thus reformed pockets. In some arrangements such reverse-rotation does not reengage the clutch, but other means are used.

It is also possible to set the clutch up to lock when overloaded. In such an arrangement the balls, after being cammed out of their pockets by a torque overload, can move angularly limitedly between the two members before moving against an abutment that locks the two members relative to each other, even though the torque being transmitted substantially exceeds the overload-cutout force. In this type of arrangement some sensor, for instance a rotation-detecting switch, is employed to shut off the drive during the short time between when the clutch disengages and when it locks up. This sensor can also work with a controller to open up an upstream clutch or transmission, or to otherwise stop rotating the driving clutch member.

My earlier patent describes a system where a cage is used having separate lodgements for the rollers. This cage is not only a fairly expensive item to manufacture, but must be positioned centrally in a location which ideally should be used to transmit torque. The pusher element that exerts the spring force on the rollers is formed like the race of an axial-force roller bearing so that if rollers are between the track of this element and the clutch member track it takes very little force to put the rollers back into the pockets. Vibration or some other minor external shock can, therefore, close up the clutch.

Another arrangement described in German patent 32 08 182 uses a separate cage for the rollers. The clutch members are constructed so that there is little axial room left in the device. As a result it is necessary to make the recesses very shallow and the flanks relatively flat, which type of construction either greatly limits the upper limit of the overload torque or requires that an extremely powerful spring be used. In addition the rotational mounting of the clutch members requires structure taking up quite a bit of room and even so there is substantial rolling friction between rollers, the pusher element pushing them in one direction, and the clutch members they roll on. As a result of the space constraints there is virtually only point contact between the rollers and the pusher element.

My earlier patent further suggests forming one of the clutch members with two angularly limited tracks for each pocket to receive the rollers when the clutch is overloaded.

As a result of the angular extent of these formations, such construction limits the amount of rollers that can be used, thereby of course limiting the torque that the clutch can transmit while increasing the amount of wear the rollers are subject to.

It is also possible as described in above-cited German 3,208,182 to limit the angular movement of the cage relative to one of the clutch members by providing a pin projecting either from the cage or the one clutch member and engaging in an angularly extending slot of the one clutch member or cage. This allows one to shorten the path of the rollers so that more such rollers can be used. Such a system allows only very small roller balls to be used so that since the force-transmitting potential of balls used as rollers is equal to the square of their diameter such an arrangement only has limited load potential. In addition such an arrangement is not usable at high speeds as it is offcenter and would be torn loose if it were used to stop the considerable momentum of a rapidly rotating cage and balls.

There is another system in my above-cited patent used to reduce torque after overload cutoff described which operates in either rotational sense. This arrangement has the problem that, if reversed to reengage the clutch, it is possible to move the rollers past the pockets if one moves too rapidly, that is the rollers move right over the pockets from their lodgements to one angular side of them to their lodgements on the opposite angular side. Thus it is frequently necessary to gently reverse the drive many times before the clutch reengages, a procedure that obviously puts considerable wear on drive components while doing no useful work. Such an arrangement is virtually unusable with an automatic piece of equipment.

When such a clutch is used in a system where the two members are only to be coupled in one or more predetermined angular positions, the overall clutch rating is substantially limited. Furthermore when the device is used in an arrangement where the clutch goes through an alternating torque after being overloaded, it is necessary to provide expensive planetary gearing that takes up quite a bit of room.

OBJECTS OF THE INVENTION

It is therefore an object of the present invention to provide an improved overload clutch.

Another object is the provision of such an overload clutch which overcomes the above-given disadvantages, that is which is inexpensive to manufacture and which can transmit considerable torque.

A further object is to provide such a clutch which can readily be adapted to the various possible functions outlined above, that is which either opens, opens then locks, or steps down when the overload torque is exceeded, and/or that only closes in defined relative angular positions of the clutch members.

SUMMARY OF THE INVENTION

An overload clutch according to the invention has a pair of clutch members relatively rotatable about an axis and each formed with an axially forwardly directed track and with a plurality of angularly spaced seats opening into the track, these seats being alignable to form axially forwardly open pockets in at least one relative angular position of the members. A bearing supports the members on each other for relative rotation about the clutch axis. Respective rollers engageable in the pockets are angularly displaceable in the tracks so that when they are in the pockets the two members are rotationally coupled such that one can drive the other and when the rollers are in the track the members are relatively rotatable. A ring member operatively backwardly engaging the rollers is pressed by a spring backward relative to the clutch members against the rollers to urge the rollers into the pockets, the flank angle of the seats being such that rollers in the pockets are pressed forward against the ring member with a force component largely dependent on torque transmitted between the two clutch members. An abutment on one of the members is operatively engageable with the rollers to limit their angular travel in the tracks relative to the on member.

This abutment according to the invention is positioned such that the rollers are arrested by the abutment when traveling angularly in the tracks at positions on the tracks between the seats thereof. In addition a deflector can be provided fixed on the one clutch member offset from the abutment and in the path of the rollers traveling angularly in the track and engageable with the rollers when same are generally aligned with the seats of the one clutch member for deflecting them into the seats of the one member.

With the system of this invention, therefore, the clutch can be reset extremely easily, with a simple reverse rotation equal to normally no more than the angular spacing between two adjacent clutch-member seats. In addition such a clutch can be made extremely easily and automatically will compensate for minor tolerance deviations and wear. Furthermore the inherently simultaneous return of all of the rollers to the pockets will ensure that the clutch always has the same nominal overload torque, it being impossible for one roller to hang up or for less than all of the rollers to fit into their pockets at the same time.

According to another feature of this invention the abutment is on one of the clutch members and is directly engageable with the rollers. Such construction is extremely simple and compact.

The abutment can also be on one of the clutch members and be directly engageable with the ring member and the ring member can be formed with seats in which the rollers are normally received and which angularly restrict displacement of the rollers. In another system of this invention the abutment is carried on the ring member and the ring member is formed with seats as described immediately above. The seats can receive the rollers with play.

The rollers can be balls or wheels in which case the ring member includes radially extending axles carrying the wheels. The seats of the clutch members according to this invention are angularly identically equispaced and the abutment can be provided in one of the seats of one of the members. This makes it possible to manufacture similar clutch members, and to easily equip one of the members, depending on use, with the abutment which will then inherently hold the balls in a position out of alignment with the seats of this one member.

In addition it is possible for one abutment to be provided on one of the clutch members and another abutment on the ring member. These two abutments have mutually engageable surfaces extending nontangentially and nonradially of the axis.

The ring member of this invention can be formed as described above with axially open recesses receiving and confining the rollers and with an axially oppositely directed abutment formation and the abutment can be a pawl pivotal on one of the clutch members and engageable with the abutment formation. The pivot axis of the pawl and the formation, typically a notch cut in the back face of the cage, are set so that on decoupling the pawl and back face will slide on each other, but on reverse rotation for reset they will catch and the pawl will arrest the cage and force it down when the balls are in a desired position above the seats of the clutch member carrying this pawl.

Further according to this invention the abutment can be a lock pin axially engageable in one of the clutch members with the cage to rotationally arrest same relative to the one clutch member.

In addition the clutch can have a cylinder on one of the clutch members subdivided by the ring member into a pair of pressurizable compartments. In this case the abutment can be be the above-mentioned lock pin axially engageable in one of the clutch members with the cage to rotationally arrest same relative to the one clutch member and this lock pin has a piston exposed to the pressure in one of the chambers. Pressurization of the chambers can therefore control the overload torque threshhold and the decoupling on opening.

In another system the ring member is a cage formed with recesses axially receiving and angularly confining the rollers and both clutch members and the ring member are provided with such abutments. In this case it is within the scope of this invention to use a roller bearing between the spring and the ring member.

In accordance with another inventive feature one of the tracks is axially offset forward of the other track so that when the rollers are out of the pockets they ride only on the one track.

The clutch according to this invention can also have a swivel joint between the two clutch members permitting same to rotate about inclined axes.

A clutch of the type according to this invention can also have an axially projecting tooth formed on the cage offset from the axis, a generally flat track formed on one of the clutch members and a recess generally complementary to the tooth and opening on the flat track on the one member for receiving the tooth only in the predetermined angular position of the cage and the one clutch member, whereby the clutch members can only be coupled in this one position. For symmetrical fit the clutch has two such teeth, flat tracks, and recesses angularly and radially offset from one another.

According to another feature of this invention one of the clutch members is provided with a brake, for instance a disk brake, that acts on the cage rotationally fixed to the rollers. As in the other above-discussed arrangements, such a brake in part causes the overloaded and hence open clutch to act like a roller bearing between input and output shafts. In a normal arrangement where the spring is a stack of belleville washers braced between the cage and the driven clutch member such relative rotation of the two clutch members will be accompanied by relative rotation of at least two of the spring washers. Since these elements are extremely rugged, being made of high-quality steel, such friction is not only modest, but not harmful. It provides a certain reverse angular force that maintains the clutch open for sure so long as the input clutch member rotates faster than the output member. This retaining force remains in the form of pure static friction when the input shaft and output shaft are both stopped, and reverses to roll back the rollers on reverse rotation of the input shaft to reset the clutch.

DESCRIPTION OF THE DRAWING

The above and other objects, features, and advantages will become more apparent from the following, it being understood that any feature described with reference to one embodiment of the invention can be used where possible with any other embodiment and that reference numerals not specifically mentioned with reference to one Figure but identical to those of another refer to structure that is functionally if not structurally identical. In the accompanying drawing:

FIGS. 5a, 5b, and 5c are detail side views showing yet another system in accordance with the present invention;

SPECIFIC DESCRIPTION

Figure 1:
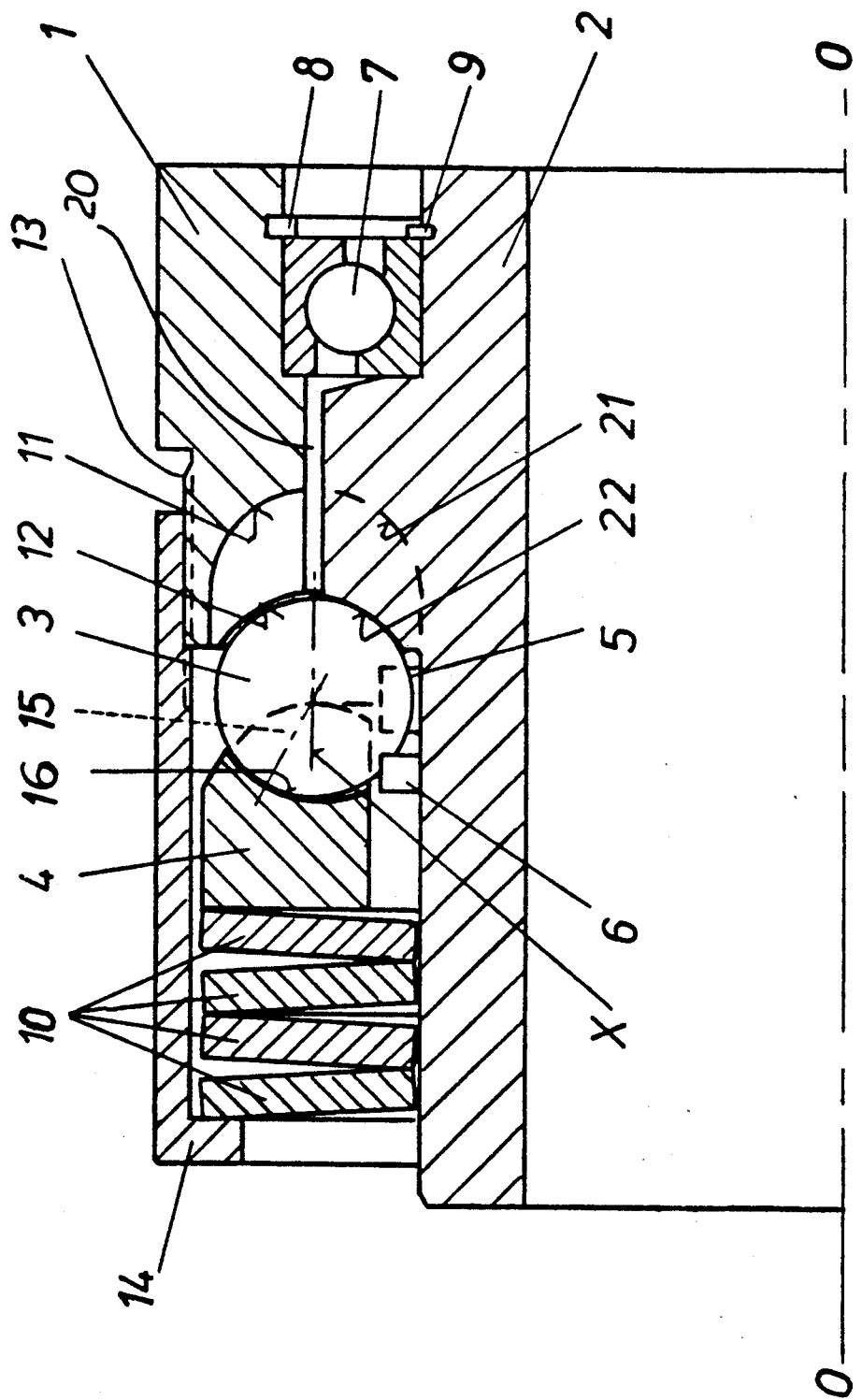
FIG. 1 is an axial section through a cutout-type overload clutch according to this invention.
Figure 2:
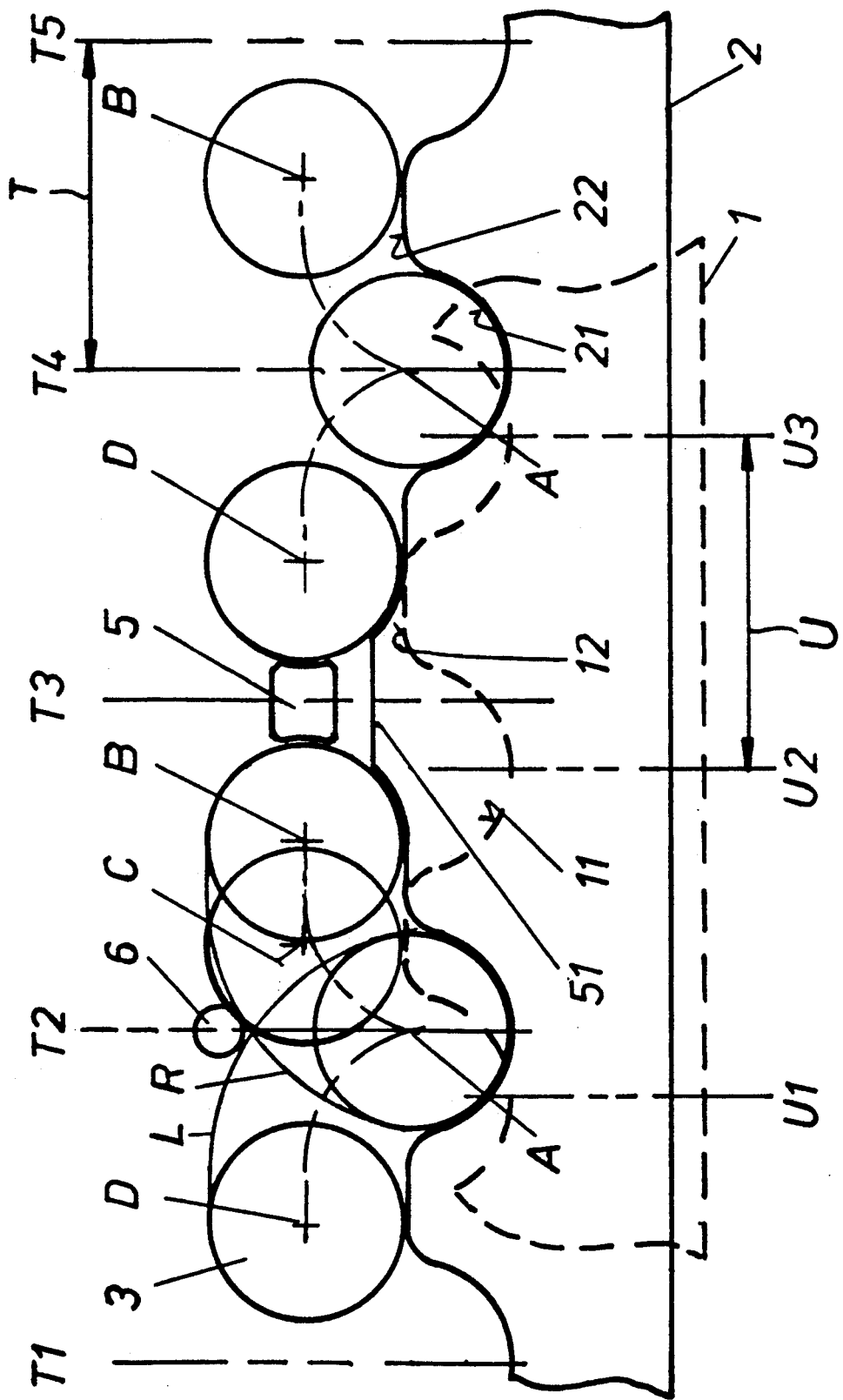
FIG. 2 is a developed side view illustrating the clutch of FIG. 1.

As seen in FIGS. 1 and 2 a simple overload-and-open clutch according to this invention has concentric driven and driving members 1 and 2 coaxial to an axis O. A bearing 7 held in place on the members 1 and 2 by respective snap rings 8 and 9 allows the two members 1 and 2 to rotate relative to one another about the axis O. In normal use the driving member 2 is carried on a motor or transmission output shaft and the driven body 1 has gearing, a pulley, or the like connected to a load.

As described in my above-cited earlier patent, of course, it would be possible to reverse these functions and even to move the rotation axis.

The members 1 and 2 are formed with respective axially open quarter-cylindrical annular tracks 12 and 22 of the same radius of curvature but with the center of curvature of the track 12 slightly offset axially back (to the right in FIG. 1) from that of the track 22 Together these tracks 12 and 22 form an axially forwardly open groove of generally semicircular shape and having a center of curvature generally at the axial space or gap 20 between the members 1 and 2. These members 1 and 2 are also formed with respective arrays of angularly equispaced and substantially identical recesses or seats 11 and 21 which are basically shaped as part spheres having forwardly flaring flanks. Each of these seats 11 or 21 of each member 1 or 2 can form with the seat 21 or 11 of the other member 2 or 1 a pocket that opens axially forward at the two tracks 12 and 22.

Balls 3 of a radius of curvature substantially equal to the radii of curvature of the tracks 21 and 22 and of the bases of the seats 11 and 21 can either ride on the tracks 12 and 22 as illustrated in the FIG. 1 and as seen at positions B, C, and D of FIG. 2, or be positioned down in the seats 11 and 21 as shown at A in FIG. 2. These balls 3 are held in pockets 15 of a cage 4 also acting as pusher ring and braced by spring washers 10 against a sleeve 14 secured to threads 13 on the driven member 1. The springs 10 therefore push the balls 3 backward against the members 1 and 2, either into firm contact with the tracks 21 and 22 or into solid engagement in the seats 11 and 12. The radius of curvature of the part-spherical pockets 15 of the cage 4 is slightly larger than that of the balls 3 to minimize friction. The cage 4 and the balls 3 move angularly jointly, there being nothing other than the friction of the cage 4 against the springs 10 to restrain its rotation relative to the members 1 and 2.

Under normal circumstances the balls 3 are engaged in the seats 11 and 21 and the two members 1 and 2 are rotationally coupled. The torque being transmitted between the members 1 and 2 produces a component which tends to cam the balls 3 out of the seats 11 and 21, but so long as this force component is less than the force of the springs 10, the balls 3 will remain in place and couple the members 1 and 2 together.

When however this axially forward force component exceeds the spring force the balls 3 will be cammed forward up the inclined flanks of the seats 11 and 21 until they ride up completely out of these seats 11 and 21. Since the track 12 is slightly axially back of the track 22, this will cause the balls 3 to roll between the track 22 and the diametrically opposite surface 16 of the respective pocket 15. As the balls 3 roll along the tracks 22 they will therefore rotate the cage 4 at half speed about the axis O, causing it to rub on the springs 10 and/or the springs 10 to rub together or on the adjustment sleeve 14.

According to this invention angular travel of the balls 3 about the axis O when overloaded is limited by an end stop 5 that is fixed on the driving member 2 and that is positioned to engage one of the two flanking balls 3 centrally when same has moved out of the seats 11 and 21 it is in. Since all the balls 3 are angularly jointly movable in and with the cage 4, only one such abutment or stop 5 need be provided.

In this arrangement the seats 21 are separated as seen in solid lines FIG. 2 at a constant spacing T and the seats 11 at an identical and constant spacing U as shown in dashed lines. The positions of four succeeding seats 21 are shown at $T_1$, $T_2$, $T_4$, and $T_5$ and the positions of four succeeding seats 11 are shown at $U_1$ through $U_4$. Only at the location $T_3$ is there no seat 21, so that the flanking seats 21 at positions $T_2$ and $T_4$ are spaced by 2U. In a standard arrangement there are twelve seats 11, eleven seats 21, and at most eleven balls 3 in the cage 4 whose pockets 14 are at the spacing U or T also.

Thus when one of the balls 3 flanking the stop 5 moves from the coupling position shown at A to the decoupling position shown at B or D, it will be arrested by the stop 5 and will thereafter rotate with the driving member 2 and the cage 4. The track 22 is raised under the stop 5 at 51 to cradle the ball 3 in these positions B and D. Presuming therefore as seen in FIG. 2 that the driving member 2 is rotating to the left, this will move the ball 3 in position $T_2$ back to the right on overload, from position A to position B. The member 1 will be able to rotate relative to the member 2 because the balls 3 will be completely out of contact with it. During such rotation the springs 10 will rub together and this friction will constitute the only coupling between the members 1 and 2. The trailing ball 3 will similarly assume the position B between the centers $T_4$ and $T_5$ and all of the other balls 3 will similarly be left perched on the track 22 between two seats 21.

Once the problem causing the torque overload has been eliminated, the driving member 2 is rotated back in the opposite direction. To prevent the balls 3 from rolling right past the pockets 11 and 21, a deflector 6 is provided on the driving member 2 above the center plane $T_2$ adjacent the center plane $T_3$ of the stop 5 and positioned so that when the ball 3 reaches the position C it can only move further from the stop 5 by moving back down into the underlying seat 21, which it can only do when same is aligned with one of the seats 11. Thus such reverse rotation will cause the balls 3 to first move to the edges of the adjacent seats 21 and then stay there until the seats 11 aligns with them, whereupon the balls 3 will drop into the aligned seats 11 and 21 as shown by line R. If motion is opposite it will follow the path of line L. Thus with the system of this invention a short reverse rotation of the driven member 2 will always ensure proper reengagement of the clutch.

Figure 2A:
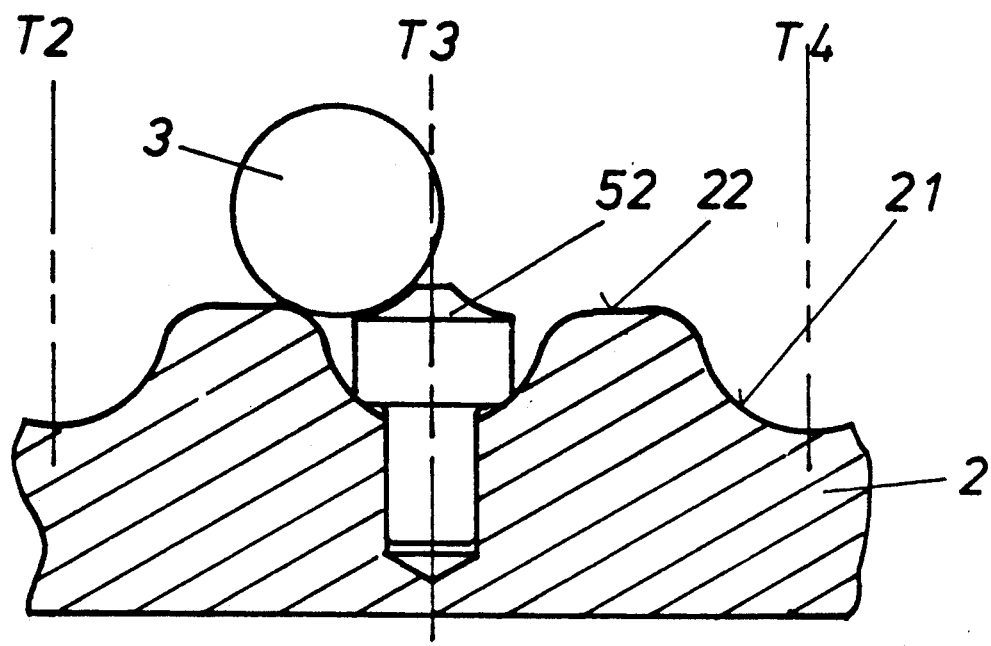
FIG. 2a is a detail view like FIG. 2 but showing a variant on the system of this invention.

Instead of the raised portion 51 and stop 5 it is possible to use as shown in FIG. 2a a bolt 52 forming a stop and itself screwed right into the driven member 2 at one of the seats 21. Such construction is particularly simple and allows the two members 1 and 2 to be manufactured easily. The shape of the bolt 52 is such that a ball 3 lying on its head has left the plane of the track 22 and lies in the upper region of the seat 21 so that the thus trapped ball 3 is held in place by the springs 10.

Figure 3:
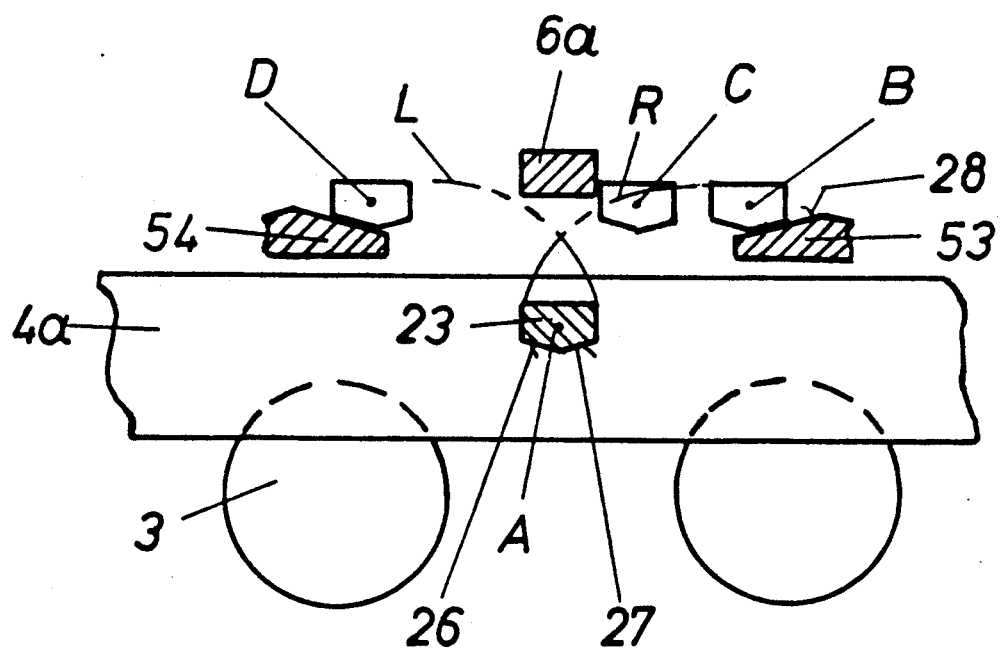
FIG. 3 is a developed and mainly schematic view illustrating another system according to this invention.

FIG. 3 shows an arrangement where the cage 4a has a radially projecting abutment 23 whose underside is provided with two opposite flanks or ramps 26 and 27 capable of engaging stops 53 and 54 having identically inclined flanks 28 and carried on the driving member 2. When the clutch is overloaded the unillustrated driven member 1 stops and the balls 3 will push the cage 4a as shown by line R up and to the right, moving it from position A to position B where the flank 27 engages atop the flank 28 of the stop 53 and the cage 4a and balls 3 are arrested relative to the member 2. The inclined flanks 27 and 28 ensure damped operation. To reset the clutch, the member 2 is reverse rotated to move the cage 4a back to position C where it engages the abutment 6a and will only move further when the balls 3 can fall back into the aligned seats 11 and 21.

In order to prevent the cage 4a from canting at least two such abutments 23 and two sets of stops 53 and 54 are used. Not only do the gently inclined flanks 26 to 28 ensure gentle damped operation, but they also make it possible if the overload is very great for the stop 23 to slide past one abutment 53 and engage the next one. These inclined flanks 26 to 28 can in fact be generally helical The arrangement of FIG. 4 has drive and driven elements 1b and 2b relatively rotatable by means of a bearing 29 and formed with seats 11b and 21b and tracks 12b and 22b identical in function to the similarly referenced structure described above. Instead of balls, this system uses rollers 31 and 32 carried on shafts 33 extending radially of the clutch axis O. The rollers 31 and 32 can also move limitedly axially of the axles 33.

The driven member 2b carries a cylinder 24 in which a piston 40 in which the shafts 33 are journaled forms a back compartment P normally also provided with compression springs 10b and a front compartment M, with seals 37 keeping these compartments substantially separate This piston 40 acts therefore as the cage for the rollers 31 and 32. A piston 18 is slidable parallel to the axis O in the cylinder 24 and has a spring 17 continuously urging it forward so that a pin 19 on this piston 18 can project into a bore of the cage/piston 40. Pressure in the chamber P is applied via a passage 39 to the piston 18 to move it forward, and a bleed passage 38 is provided to vent the chamber of this piston 18, the pressurized operating fluid normally being compressed air. This piston 40 in turn has a piston 35 with one face exposed to the pressure in the chamber M, a snap ring 36 limiting its forward travel, and a rod or stem 34 extending backward but otherwise just like the rod 19. The two rods 19 and 34 are coaxial and aligned so that they bear on one another with a force proportional to the pressure differential between the chambers P and M and to their effective surface areas, and including of course the biasing force of the spring 17.

The spring 10b, which may be a stack of spring washers as in FIG. 1, establishes a minimum threshold for response of the clutch. Additional pressurization of the chamber P can increase this threshold, and pressurization of the chamber M can reduce it. Thus this clutch has a readily adjustable response.

Figure 4:
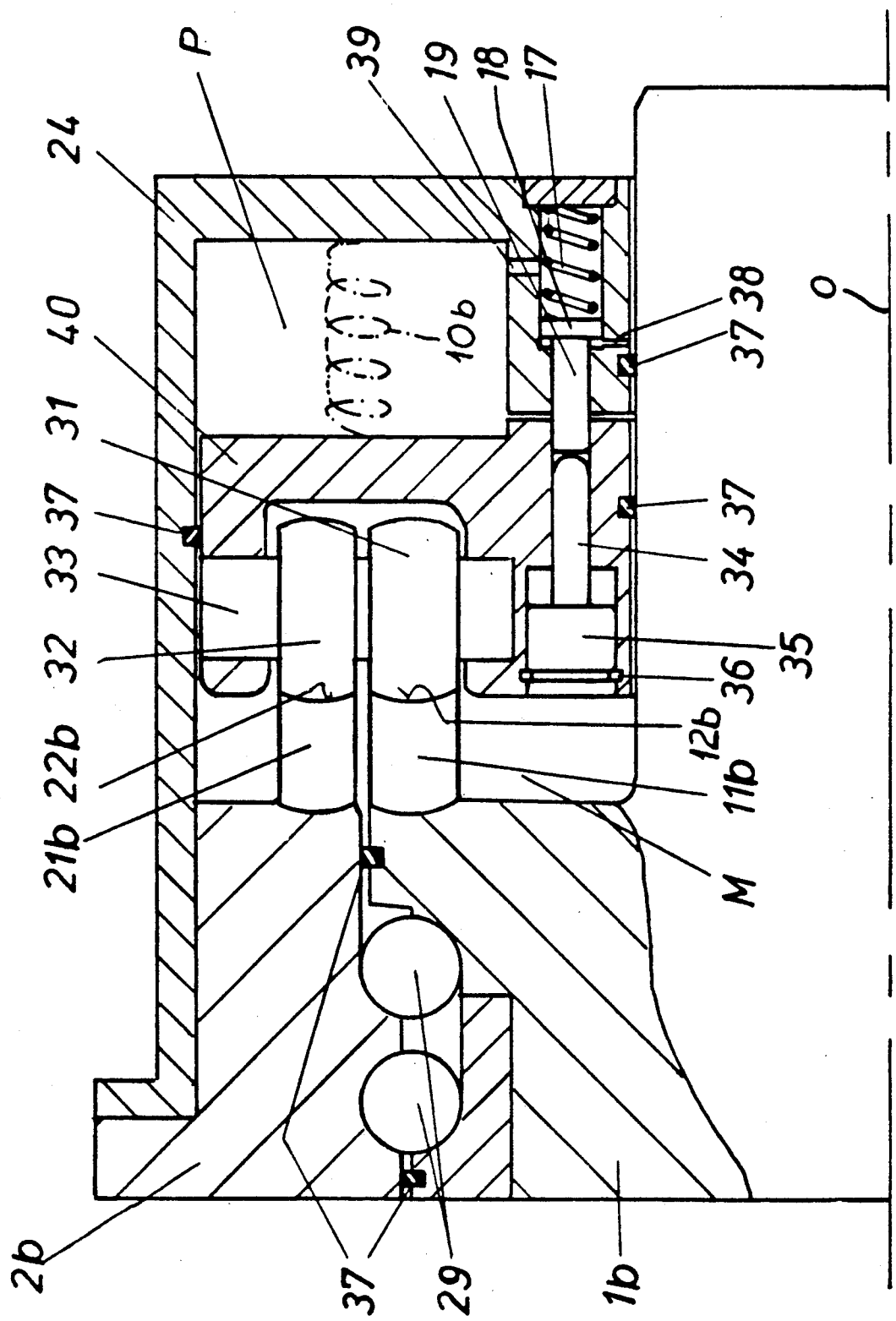
FIG. 4 is an axial section through another system according to the invention.

In the position of FIG. 4 the clutch has opened in response to an overload and the pressure differential between the chambers M and P is such that the pin 19 extends into the cage 40 and locks it relative to the member 2b. Thus the member 2b will be stationary along with the cage 40 while the member 1b rotates and the wheels 31 ride on the tracks 12b and 22b. The cage 40 is stationary because the lock rod 19 is poking from the housing 24 fixed on the stationary driven member 2b into the cage 40.

To reset the clutch after an overload the pressure differential between the chambers P and M is reversed by increasing the pressure in the chamber M and/or decreasing the pressure in the chamber P. This will force the pistons 35 and 18 to the right to a position where the lock rod 19 moves completely out of the bore of the cage 40, thereby rotationally decoupling this cage and its rollers 31 and 32 from the driven member 2b. One of the members 1b or 2b is then reverse rotated until the rollers 31 and 32 fall into the seats 11b and 21b, during which return the cushion in the chamber M damps motion.

Figure 4A:
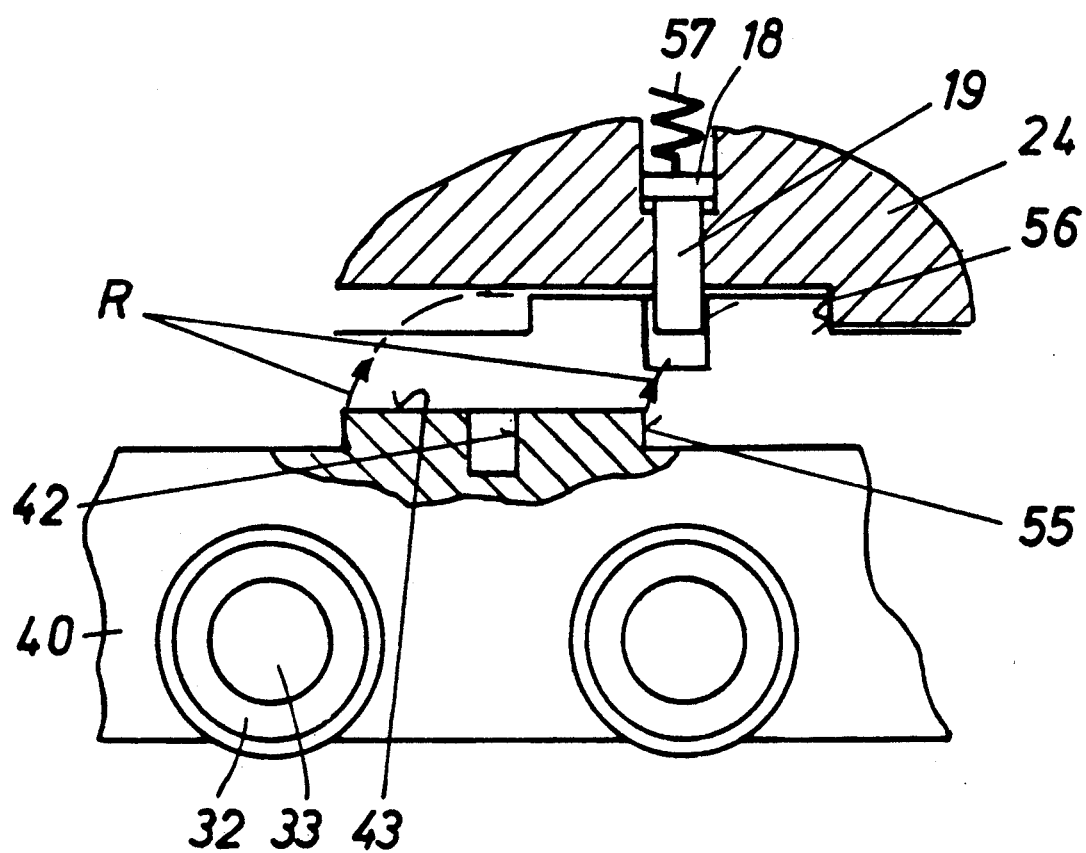
FIG. 4a is a detail side view illustrating a variant of the system of FIG. 4.

FIG. 4a shows a variation on this system. Here the rod 34 and piston 35 have been eliminated and the compression spring 17 has been replaced with a tension spring 57 so that the rod 19 normally does not project into the cage 4. When the clutch cuts out the cage 40 will move rapidly in a direction decreasing the volume of the chamber P so as to pressurize the chamber P faster than it can depressurize through the passages 38 and 39 and push the pin 19 out to engage in a hole 42 opening at a back face 43 of the cage 40. As the pressure in the chamber P bleeds off the pin 19 will retract and unlock.

This system also has on the cage 40 a projection 55 with a flank 55 that can flatly engage a flank 56 of the housing 24 fixed on the driven member 2b. These flanks 55 and 56 abut flatly when the cage 40 is to be locked, so that the pin 19 does not have to take the force of stopping the cage 40.

FIGS. 5a, 5b, and 5c show an arrangement similar to that of FIGS. 1 and 2 and using identical reference numerals for identical structure. Here, however, the cage 4 has a rear surface 74 is formed with at least one backwardly open notch 72 and the functions of the deflector 6 are assumed by a short pawl 71 pivoted at 70 on the driven member 2 and urged by a tension spring 75 anchored at 76 into a position pointing directly at the back surface 74 of the cage 4.

With this system when, as shown in FIG. 5a, the cage 4 moves up and back as indicated at R' and 78, the pawl 71 will be pivoted over until as shown in FIG. 5b it is sliding on the back surface 74. The trailing flank or edge 73 of the notch 72 might engage the pawl 71 to thus pivot it. Then when the cage 4 and balls 3 move back as shown by arrow 79 the pawl 71 will catch in a front corner 77 of the notch 72 and will hold this cage 4 in a position with the balls 3 aligned above the recesses 12 of the member 2. In this manner as the drive member 1 moves back in the direction 79 the balls 3 will drop into its seats 11 as soon as they are in position under these balls 3, which are already aligned with the seats 12. When, for example, one such pawl 71 and notch 72 is used, there will be only one relative position for the members 1 and 2 when coupled together, and when there are four notches 72, there will be four such positions, and so on.

FIG. 5 also shows how the seats 15 in the cage 4 are frustoconical in shape and formed by externally frustoconical triangular-section ridges. These seats 15 receive the balls 3 with some play so that they can move in them a little in a plane perpendicular to the clutch axis O.

Figure 6:
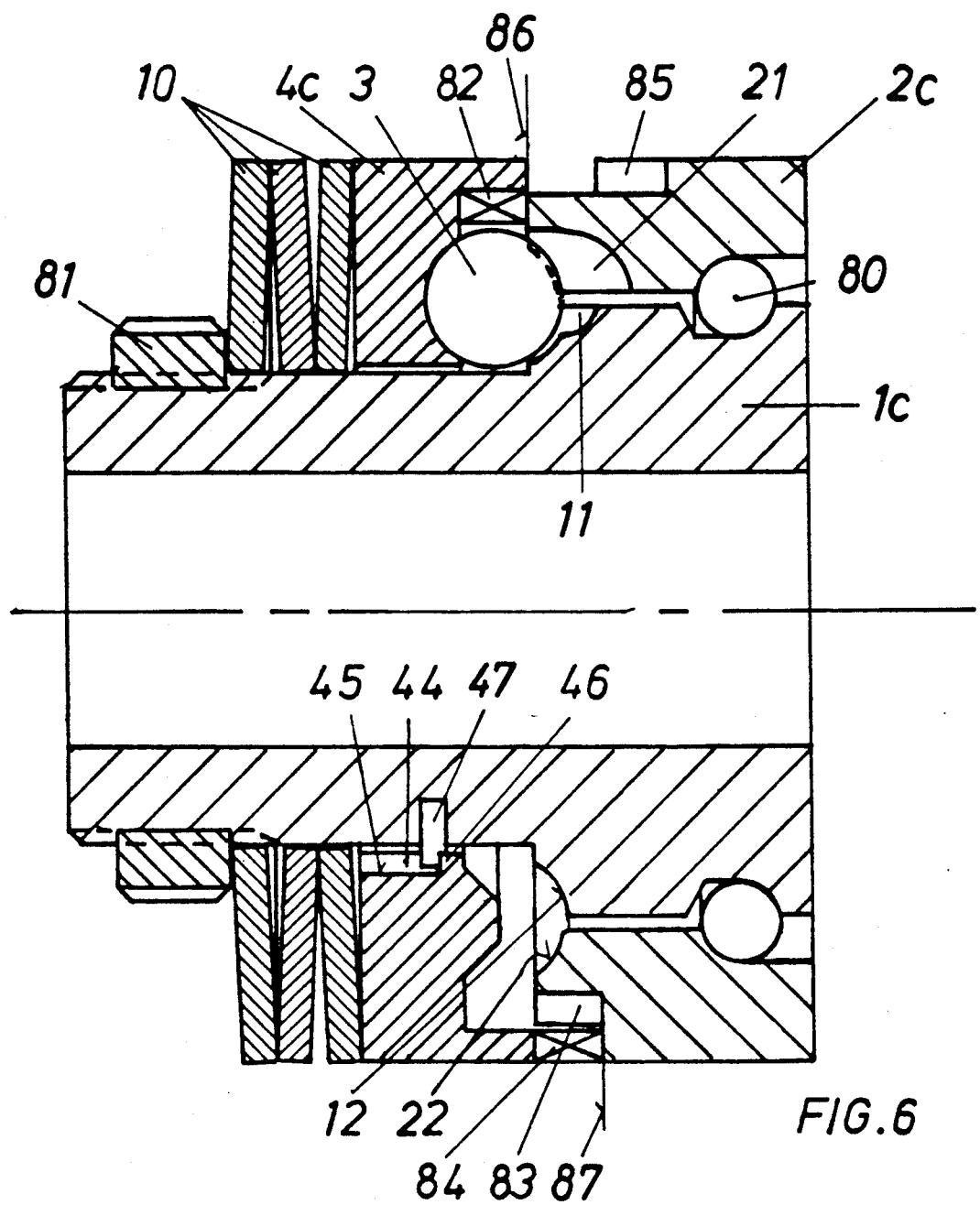
FIG. 6 is an axial section through yet another clutch according to the invention.
Figure 7:
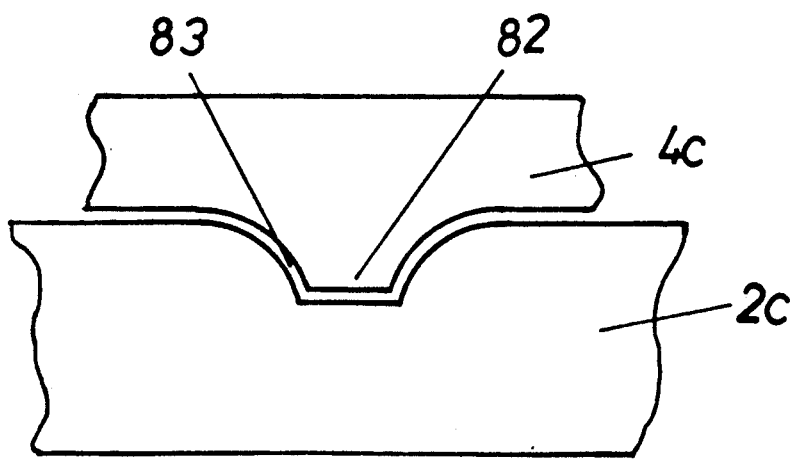
FIG. 7 is a large-scale side view of a detail of FIG. 6.

FIGS. 6 and 7 show a clutch having an internal driven member 1c on which an external driving member 2c is supported by bearings 80, these members 1c and 2b having seats 11 and 21 and tracks 12 and 22 in which balls 3 are received as in FIGS. 1 and 2. A cage 4c holding the balls 3 in axially open part-spherical seats is urged backward by washers 10 braced against a nut 81 on the part 1c, these springs 10 also keeping the bearing 80 tight and maintaining the relative axial positions of the various clutch parts.

The driven member 1c is provided with an abutment pin 47 that rides in a radially inwardly open groove 45 cut in the cage 4c and a deflector 46 also can engage this pin 47. In addition the cage 4c is formed with two diametrally offset teeth 82 and 84 terminating at respective axially offset planes 86 and 87 and engageable loosely in respective recesses or seats 83 and 85, so that these teeth 82 and 84 define a single position in which they can fit into the respective seats 83 and 85.

During normal operation with no overload the balls 3 sit in the seats 11 and 21 and the teeth 82 and 84 engage in the respective sockets 83 and 85. On overload the balls 3 are cammed out to the illustrated position. The track 22 of the drive member 2c is somewhat forward of the track 12 of the driven member 1c which is normally stationary when the clutch is overloaded. Once the balls 3 have completely run out in their tracks the pin 47 comes against one flank 44 of the groove 45 and arrests the cage 4c also.

To reset the clutch the drive member 2c is reverse rotated somewhat while the driven member 1c remains stationary. This moves the cage 4c back somewhat too until its deflector 46 engages the abutment pin 47. On further reverse rotation the teeth 82 and 84 move into alignment with the respective sockets 83 and 85 at which time the balls 3, which are aligned by the deflector 46 and abutment with the seats 21, also align with the seats 22 and the entire clutch closes up and is once again ready for service.

FIG. 7 shows how the tooth 82 and seat 83 are complementary, but the seat 83 is larger than the tooth 82 so that the tooth 82 normally does not touch it. The primary function of the identically shaped teeth 82 and 84 is to define a single operative position for the cage 4c and driven member 1c relative to the member 2c, not to rotationally link the members 1b and 2c.

Figure 8:
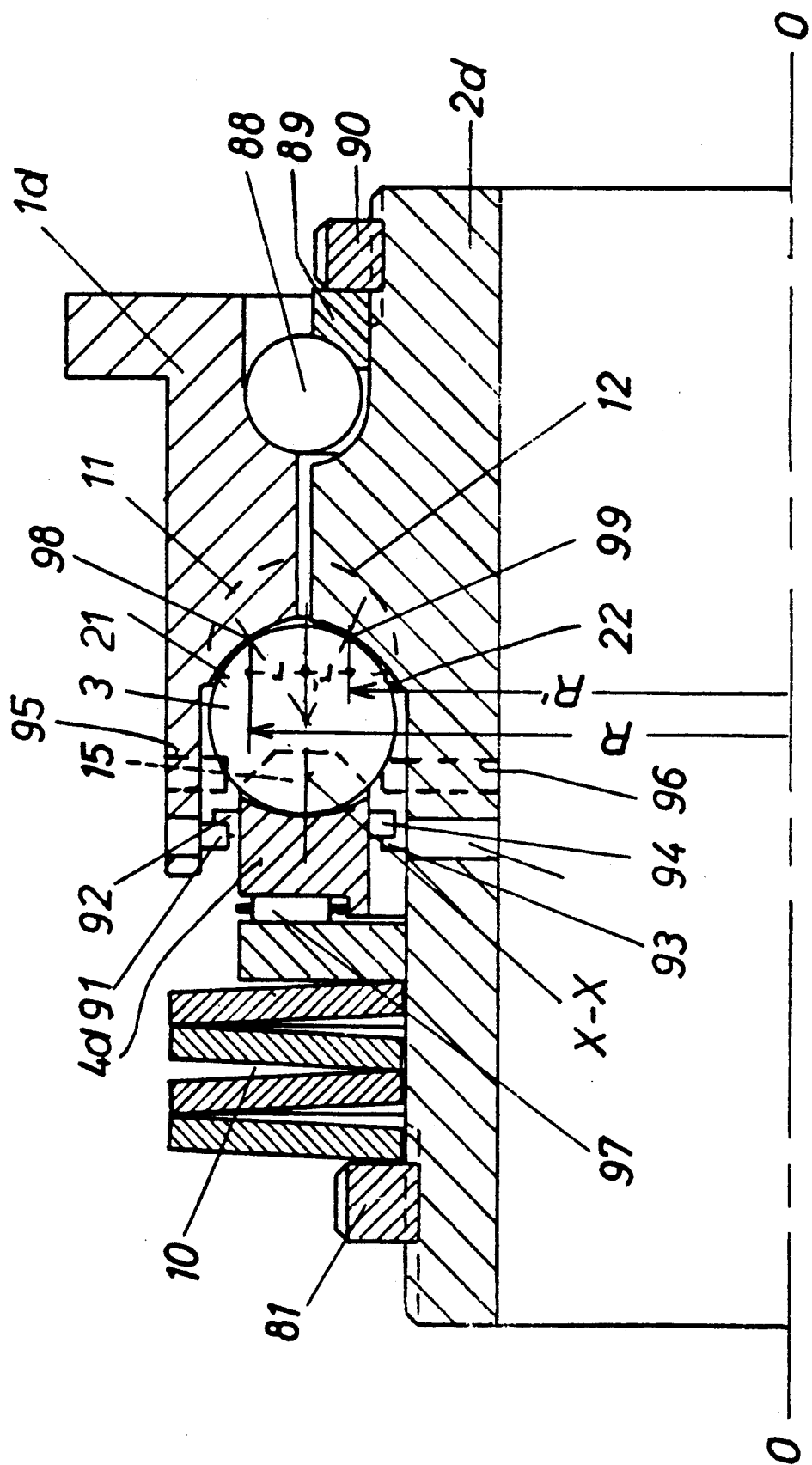
FIGS. 8 through 11 are axial sections through further clutches according to this invention.

The system of FIG. 8 is another overload design specifically designed to accurately guide the balls 3 to their following seats 11, 21 similar, to a smooth-running ratcheting clutch without possibility of these balls 3 jumping back out. To this end the tracks 12 and 22 have radii and r' and are set such that they contact the balls 3 at points 98 and 99 spaced from the clutch axis by respective distances R and R'. The ratio of these dimensions is equal, that is r/r'=R/R' so that the balls 3 will rotate about centers on a plane X—X midway between the points 98 and 99 and on the balls' centers. This effect is achieved by mounting the driven and driving members 1d and 2d on a bearing 88 having a back race 89 adjustable by a threaded ring 90.

In order to reduce residual friction the springs 10 here bear via a bearing 97 on the cage 4d. This cage 4d in turn is provided on opposite sides with stops 92 and 94 that can coact with respective deflectors 91 and 93 respectively carried on the members 1d and 2d. As described above, these parts 91 to 94 arrest the cage such that the balls 3 are ready to drop into the respective seats 11 or 21. Alternatively deflectors 95 and 96 may be provided on the parts 1d and 2b that act directly on the balls 3, not via the cage 4d.

With this system, therefore, the balls 3 will be cammed out of their seats 11 and 21 on an overload as described above and will move to on the subsequent tracks 12 and 22 to reengage with the next seats 11 and 21. The bearing 97 will allow the input member 2d to continue to rotate without substantially disturbing the device with a friction couple. The deflectors 91 to 96 reassure that the balls 3 will simultaneously and smoothly reengage with the next coming seats 11 and 21, giving an alternating torque of a value approximately equal to the overload setting.

The symmetrical support on the points 98 and 99 makes for extremely smooth operation of this device.

Figure 9:
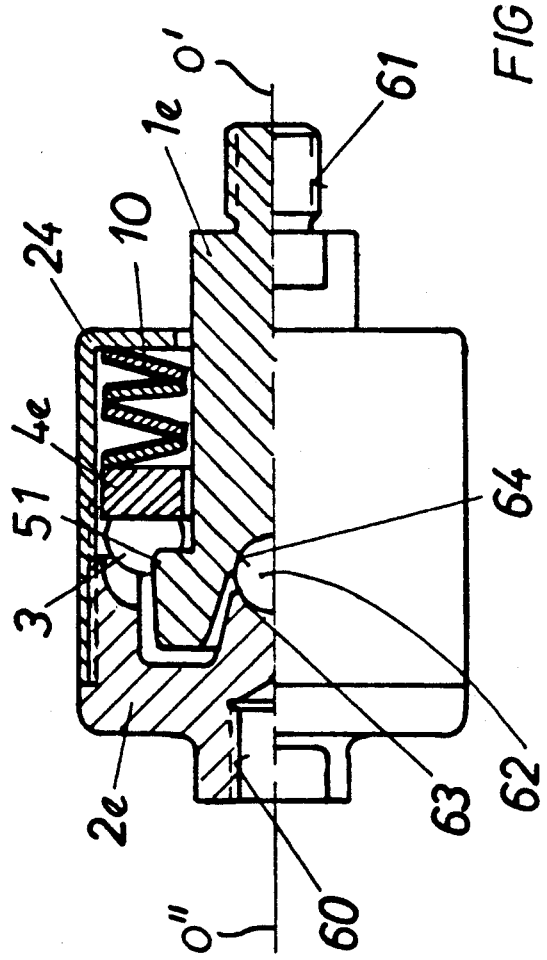

In the system of FIG. 9 the driven member 1e has an axis O' and and a threaded connector stub 61 the drive member 2e an axis O" and a threaded socket 60. In addition these members 1e and 2e have respective axially centered semispherical sockets 64 and 63 in which sits a coupling ball 62 allowing them to be canted slightly relative to each other, that is with the axes O' and O" intersecting but not parallel. Otherwise this arrangement is substantially identical to that of FIGS. 1 and 2, except that here a formation 51 formed directly on the driven member 1e to arrest the balls 3 at a maximum deflected position.

Figure 10:
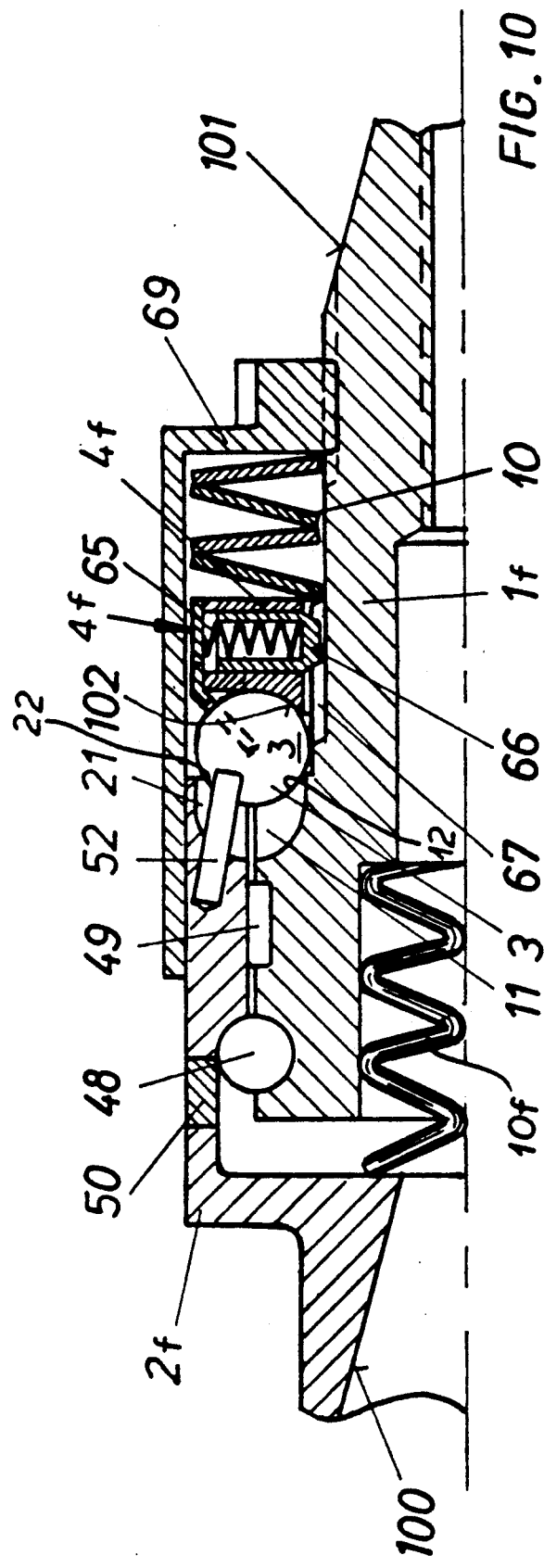

The system of FIG. 10 is a special-duty clutch that opens not only when given a torque overload, but also when excessive axial force is being exerted through the clutch in the form of axial compression. Such a clutch is extremely useful in, for example, a drill as it will open if the drill bit jams and also if the bit becomes so very dull that it must be pressed with excessive force against the workpiece. This is useful in an automatic machine where the operator has no feel of whether the bit is in fact getting dull.

In this arrangement the driven and driving parts 1f and 2f have Morse-type tapered ends 101 and 100 suitable for connection respectively to a chuck and drill shaft. The two parts 1f and 2f are relatively rotatable by means of an axial-force bearing 48 comprised of balls admitted through a hole 50 and a needle-type radial-force bearing 49. A spring 10f is braced axially between the parts 1f and 2f and a cap 69 equivalent to the housing 24 is threaded on the part 1f and contains spring washers 10 braced against a cage 4f pressing balls 3 into seats 11 and 21 or against tracks 12 and 22.

In this arrangement the cage 4f, which angularly confines and travels with the balls 3, has a radially displaceable latch bolt 66 urged by a spring 65 into radial engagement in a radially outwardly open slot 67 of the driven member 1f, thereby at least limited rotationally linking these two elements. The recesses 11 and 21 are identically and symmetrically shaped so that the force of the springs 10 is exerted in half via the balls 3 on the part 1f and in half on the part 2f, but since the opposite ends of the springs 10 are braced against the part 1f via the sleeve 69 this half of the spring force is effectively canceled out. As a result under normal operational circumstances when the bit carried by the part 1f is being pushed into the workpiece with more force than half of the force of the springs 10, the output member 1f will move somewhat to the left as seen in FIG. 10 into the part 2f, that is more deeply into the part 2f. This shifting moves the seats 11 also so that the balls 3 engage solely the seats 21 and the diametrally opposite track 102 of the cage 4f. As a result the clutch responds not only to the torque it is transmitting, but also to the axial force, since once enough axial force is applied to push the balls 3 out of the seats, the clutch will open as well as when the torque is exceed. The axial response can be increased or decreased by means of the spring 10f which can be a compression or tension spring.

Figure 11:
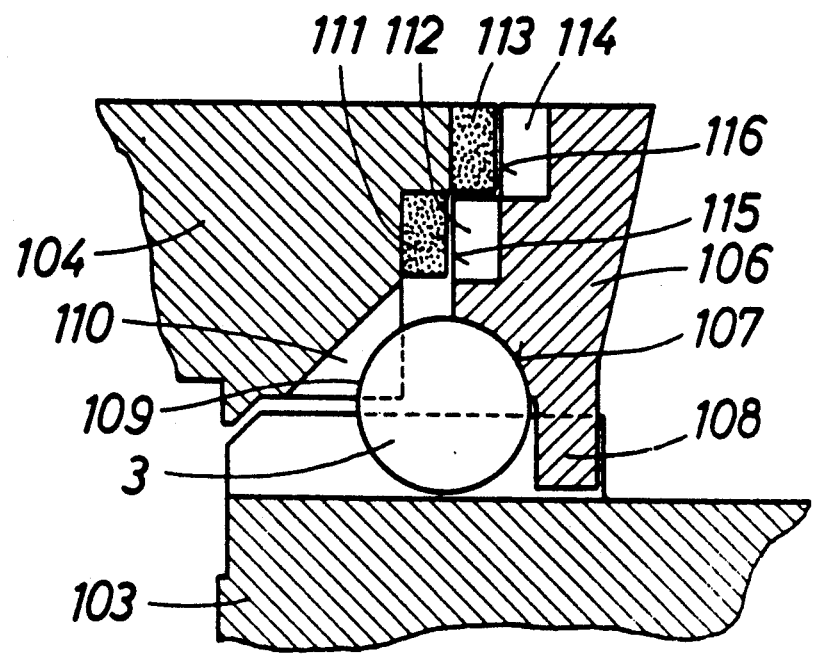

FIG. 11 shows a ratcheting clutch which only closes in one or more specific relative angular positions. This clutch has a driving member 103 and a driven member 104 engaging around it, with ribs 105 confining balls 3 while letting them move axially. The balls 3 are loaded by an unillustrated spring which presses on a pusher plate 106 forming an annular track 107 for these balls 3 and which has projections 108 between the ribs 3 so that this plate 106 is rotationally linked to the driving member 103 but can move axially relative thereto. The driven member 104 is also formed with a track 109 interrupted by seats 110 for the balls 3. In addition the members 103 and 104 are formed with respective teeth 111 and 113 and seats 114 and 115 which are shown in the drawing as being coplanar but which actually are angularly offset to define the above-mentioned obligatory angular positions of these members 103 and 104.

With this system, therefore, as in the system of FIGS. 6 and 7, on overload the balls 3 will travel around the clutch and will only be able to return to their seats 110 when the teeth 111 and 113 are aligned with their recesses 114 and 115. As a result when this clutch opens it will stay open, even if the overload is released, until it is properly aligned. Of course it will also stay open or reopen if the overload remains.

In all of the above-mentioned embodiments the balls rotationally entrain their cage when the clutch is overloaded. There is some drag transmitted by this cage to one of the members either by friction through the springs, through a bearing, or through a seal, so that some residual force is always present.

I claim:

1. An overload clutch comprising:

a pair of clutch members relatively rotatable about an axis and one of which is formed with an axially forwardly facing track and with a plurality of angularly spaced seats opening into the tracks, the other clutch member being formed with corresponding seats, the seats being alignable to form axially forwardly open pockets;

means including a bearing supporting the members relative to each other for relative rotation about the clutch axis;

respective rolling elements engageable in the pockets and angularly displaceable in the track;

a ring member rotatably fixed to the rolling elements forming a cage and pressing the rolling elements in their respective pockets, whereby when the rolling elements are in the pockets in a predetermined relative angular position of the cage and clutch members the two members and cage are rotationally coupled such that one clutch member can drive the other and when the rolling elements are in at least one track the clutch members are relatively rotatable;

means including a spring for pressing the ring member backward relative to the clutch members against the rolling elements and thereby urging the rolling elements into the pockets, the flank angle of the seats being such that the rolling elements in the pockets are pressed forward against the ring member with a force component largely dependent on torque transmitted between the two clutch members;

means including abutments on one of said members operatively engageable with the rolling elements permitting their axial travel in the seats of said one member only at a predetermined angular position; and means including an axially projecting tooth on the cage offset from the axis, a generally flat track formed on the other of said members and a recess generally complementary to the tooth and opening on the flat track for receiving the tooth only in the predetermined angular position of the cage and the one clutch member, whereby the clutch members can only be coupled in this one angular position.

2. The overload clutch defined in claim 1 wherein at least two such teeth and recesses are provided angularly or radially offset from one another with corresponding flat tracks.

3. An overload clutch comprising:
a pair of clutch members relatively rotatable about an axis and one of which is formed with an axially forwardly facing track and with a plurality of angularly spaced seats opening into the tracks, the other clutch member being formed with corresponding seats, the seats being alignable to form axially forwardly open pockets;
means including a bearing supporting the members relative to each other for relative rotation about the clutch axis;
respective rolling elements engageable in the pockets and angularly displaceable in the track;
a ring member engaging the rolling elements;
means rotatably confining the rolling elements and the ring member to one of the clutch members;
means including a spring for pressing the ring member backward relative to the clutch members against the rolling elements and thereby urging the rolling elements into the pockets, the flank angle of the seats being such that the rolling elements in the pockets are pressed forward against the ring member with a force component largely dependent on torque transmitted between the two clutch members; and
means including an axially projecting tooth on the ring member offset from the axis, a generally flat track formed on the other of said members and a recess generally complementary to the tooth and opening on the flat track for receiving the tooth only in a predetermined angular position of the ring member and the other clutch member, whereby the clutch members can only be coupled in one angular position.

4. The overload clutch defined in claim 3 wherein at least two such teeth and recesses are provided angularly or radially offset from one another with corresponding flat tracks.

5. An overload clutch comprising:
a pair of clutch members relatively rotatable about an axis and each formed with an axially forwardly facing track and with a plurality of angularly spaced seats opening into the track, the seats being alignable to form axially forwardly open pockets in at least one relative angular position of the members;
means including a bearing supporting the members relative to each other for relative rotation about the clutch axis;
respective angularly spaced rolling elements engageable in the pockets and angularly displaceable in the tracks, whereby when the rolling elements are in the pockets the two members are rotationally coupled such that one can drive the other and when the rolling elements are in at least one track the members are relatively rotatable;
a ring member engaging the rolling elements;
means including a spring for pressing the ring member backward relative to the clutch members against the rolling elements and thereby urging the rolling elements into the pockets, the flank angle of the seats being such that the rolling elements in the pockets are pressed forward against the ring member with a force component largely dependent on torque transmitted between the two clutch members;
cage means formed by said ring member for holding the rolling elements at their angularly spaced positions; and
wherein said rolling elements are balls and said ring member providing said cage means is formed with axially open seats receiving and confining said balls.

6. The overload clutch defined in claim 5 wherein said seats of said ring member are mated with said balls with a given conformity at least in the direction of the pitch circle of said balls.

7. An overload clutch comprising:
a pair of clutch members relatively rotatable about an axis and one of which is formed with an axially forwardly facing track and with a plurality of angularly spaced seats opening into the tracks, the other clutch member being formed with corresponding seats, the seats being alignable to form axially forwardly open pockets;
means including a bearing supporting the members relative to each other for relative rotation about the clutch axis;
respective rolling elements engageable in the pockets and angularly displaceable in the track;
a ring member rotatably fixed to the rolling elements forming a cage and pressing the rolling elements in their respective pockets, whereby when the rolling elements are in the pockets in a predetermined relative angular position of the cage and clutch members the two members and cage are rotationally coupled such that one clutch member can drive the other and when the rolling elements are in at least one track the clutch members are relatively rotatable;
means including a spring for pressing the ring member backward relative to the clutch members against the rolling elements and thereby urging the rolling elements into the pockets, the flank angle of the seats being such that the rolling elements in the pockets are pressed forward against the ring member with a force component largely dependent on torque transmitted between the two clutch members;
means including abutments on one of said clutch members operatively engageable with the rolling elements permitting their axial travel in the seats of said one member only at a predetermined angular position, and
means including an axially projecting tooth on the cage offset from the axis, a generally flat track formed on the other of said members and a recess generally complementary to the tooth and opening on the flat track for receiving the tooth only in the predetermined angular position of the cage and the one clutch member, whereby the clutch members can only be coupled in this one angular position.

8. An overload clutch comprising:
a pair of clutch members relatively rotatable about an axis and one of which is formed with an axially forwardly facing track and with a plurality of angularly spaced seats opening into the tracks, the other clutch member being formed with corresponding seats, the seats being alignable to form axially forwardly open pockets;

means including a bearing supporting the members relative to each other for relative rotation about the clutch axis;

respective rolling elements engageable in the pockets and angularly displaceable in the track;

a ring member engaging the rolling elements;

means including a spring for pressing the ring member backward relative to the clutch members against the rolling elements and thereby urging the rolling elements into the pockets, the flank angle of the seats being such that the rolling elements in the pockets are pressed forward against the ring member with a force component largely dependent on torque transmitted between the two clutch members;

means rotatably confining the rolling elements and the ring member to one of the clutch members; and means including an axially projecting tooth on the ring member offset from the axis, a generally flat track formed on the other of said clutch members and a recess generally complementary to the tooth and opening on the flat track for receiving the tooth only in a predetermined angular position of the ring member, whereby the clutch members can only be coupled in one angular position.

9. The overload clutch defined in claim 8 wherein at least two such teeth and recesses are provided angularly or radially offset from one another, with corresponding flat tracks.

10. An overload clutch comprising:

a pair of clutch members relatively rotatable about an axis and each formed with an axially forwardly facing circumferentially directed track and with a plurality of angularly spaced seats opening into the tracks, the seats being alignable to form axially forwardly open pockets in at least one relative angular position of the members;

means including a bearing supporting the members relative to each other for relative rotation about the clutch axis;

respective angularly spaced rolling elements engageable in the pockets and angularly displaceable in the tracks, whereby when the rolling elements are in the pockets the two members are rotationally coupled such that one can drive the other and when the rolling elements are in the tracks the members are relatively rotatable;

cage means engaging and holding the rolling elements at their angularly spaced positions;

means including a spring for pressing the cage means backward relative to the clutch members against the rolling elements and thereby urging the rolling elements into the pockets, the flank angle of the seats being such that the rolling elements in the pockets are pressed forward against the ring member with a force component largely dependent on torque transmitted between the two clutch members; and deflector means including an abutment on one clutch member operatively engageable with deflector means including an abutment on the cage means when the rolling elements are generally aligned with the seats of the one clutch member are deflecting them into the seats of the one member.

* * * * *